United States Patent

[11] 3,566,085

[72] Inventor Etsuro Nagata
Tokyo, Japan

[21] Appl. No. 783,693
[22] Filed Dec. 13, 1968
[45] Patented Feb. 23, 1971

[73] Assignee Tokyo Shibaura Electric Co.
Kawasaki-shi, Japan

[32] Priority Dec. 20, 1967
[33] Japan
[31] 42/81209

[54] PHOTOELECTRIC READING APPARATUS
4 Claims, 8 Drawing Figs.

[52] U.S. Cl. .......... 235/61.11, 250/219
[51] Int. Cl. .......... G06k 7/10, G01n 21/30
[50] Field of Search .......... 235/61.115, 61.12, 61.111, 61.11; 250/219 (Tdc); 178/95 (Cursory), 17 (Cursory)

[56] References Cited

UNITED STATES PATENTS

| | | | |
|---|---|---|---|
| 3,222,501 | 12/1965 | Wood | 235/61.7 |
| 3,229,073 | 1/1966 | Macker | 235/61.11 |
| 3,293,415 | 12/1966 | Fiehl | 235/61.11 |
| 3,341,691 | 9/1967 | Modersohn | 235/61.11 |
| 3,461,305 | 8/1969 | Moulton | 250/219I |

*Primary Examiner*—Daryl W. Cook
*Assistant Examiner*—Robert M. Kilgore
*Attorney*—Flynn and Frishauf

ABSTRACT: A photoelectric reading apparatus for tapes perforated with sprocket apertures and data apertures is provided with an additional photoelectric element for the sprocket apertures and with AND circuits corresponding in number to data flip-flop circuits and connected between the data flip-flop circuits and an external apparatus. A sprocket flip-flop circuit is reset when the additional element detects the latter edge of its corresponding sprocket aperture, thus supplying an input to one input terminal of an AND circuit connected with the set terminal of a start-and-stop flip-flop circuit. The other input terminal of the AND circuit is rendered open when a stop order is supplied thereto. Once the start-and-stop flip-flop circuit is set, data signals are never supplied from the data flip-flop circuits to the external apparatus even when the sprocket flip-flop circuit is set due to undesired vibrations of the perforated tapes.

INVENTOR.
ETSURO NAGATA
BY Fitzpatrick & Frishauf
Atty

PHOTOELECTRIC READING APPARATUS

The present invention relates to a photoelectric reading apparatus and more particularly to a reading apparatus most adapted for use in the operation control device of an electronic computer.

The conventional device for photoelectrically reading perforated paper tapes used as a recording medium which has heretofore been generally adapted is of such type as shown in FIGS. 1 and 2. (FIG. 1 is a schematic perspective view of the photoelectric conversion section of the prior device and FIG. 2 represents a reading control circuit connnected to the conversion section of FIG. 1.) With the prior art device, there is interposed a paper tape stored with signals between an illuminating lamp 1 and a photoelectric conversion means 2, and the signals stored in the paper tape are successively read out by a photoelectric conversion means with the feeding of the paper tape. These signals are stored in the form of data apertures perforated in the paper tape and sprocket apertures also bored therein for effecting the strobe of said data apertures. At this point there is described an 8-channel-type perforated paper tape wherein there are formed 8 data apertures 4 in a perpendicular direction to the feeding of the paper tape, namely, in a lateral direction. The data apertures 4 always have a larger size than sprocket apertures 5. The terminals $6_1$, $6_2$ ..... $6_9$ of the photoelectric conversion means 2 are supplied with electric signals corresponding to the apertures formed in the tape. These terminals are connected to their respective amplifiers $7_1$, $7_2$ ..... $7_9$. The output terminal of the amplifier $7_1$ supplied with signals by the sprocket aperture is connected to the set terminal S of a flip-flop circuit 8 for the sprocket aperture and also through an inverter circuit 9 to the reset terminal R of the flip-flop circuit 8. On the other hand, the output terminals of the other amplifiers $7_2$, $7_3$ ..... $7_9$ are respectively connected through AND circuits $10_1$, $10_2$ ..... $10_8$ to the set terminal S of flip-flop circuit $11_1$, $11_2$ ..... $11_8$ for the data aperture and also to the reset terminals R of the data flip-flop circuits $11_1$, $11_2$ ..... $11_8$ through inverter circuits $12_1$, $12_2$ ..... $12_8$ and AND circuits $13_1$, $13_2$..... $13_8$. The output terminal of the sprocket flip-flop circuit 8 is connected to all the input terminals of the AND circuits $10_1$, $10_2$ ..... $10_8$ and $13_1$, $13_2$ ..... $13_8$. The output terminals of the the data flip-flop circuits $11_1$, $11_2$ ..... $11_8$ are connected to an external apparatus 14, for example, an operation control circuit. This external apparatus 14 is connected through an AND circuit 17 to the set terminal S of a start-and-stop flip-flop circuit 16. This AND circuit 17 is connected through an inverter circuit 18 to all the input terminals of the aforementioned a AND circuits $10_1$, $10_2$ ..... $10_8$ and $13_1$, $13_2$ ...... $13_8$ and also to the output terminal of the sprocket flip-flop circuit 8. The output terminals of the start-and-stop flip-flop circuit 16 are respectively connected to a brake means for suspending the feeding of the perforated tape and a starting means for initiating said feeding.

There will now be described the operation of the photoelectric reading apparatus of the prior art by reference, for example, to the case where only to terminal $6_1$ of the photoelectric conversion means is supplied with signals. (In this case, signals by the sprocket aperture are, of course, supplied to the terminal $6_4$ of said conversion means.) Electric signals from the terminal $6_4$ are amplified by the amplifier $7_1$ and forwarded to the set terminal S of the sprocket flip-flop circuit 8, and then through this circuit 8 to the AND circuits $10_1$, $10_2$, ..... $10_8$ and $13_1$, $13_2$ ..... $13_8$.

On the other hand, an output from the terminal $6_1$ is carried through the amplifier $7_2$ to the AND circuit $10_1$. An output from the N AND circuit $10_1$ is supplied to the set terminal S of the data flip-flop circuit $11_1$ due to its coincidence with outputs from the flip-flop circuit 8. Then an output from the flip-flop circuit $11_1$ is sent to the external apparatus 14, from which is issued by other means a signal corresponding to said output. In this a case, the inverter circuits $12_2$ ..... $12_8$ connected to the other terminals $6_2$ ..... $6_9$ of the photoelectric conversion means 2 produce si output signals, and the outputs reset the data flip-flop circuits $11_2$ ..... $11_8$.

For instance instance, where the signal forwarded through the terminal $6_1$ to the external apparatus 14 represents a stop signal, then said stop signal is carried from said external apparatus 14 through a terminal 15 and to the AND circuit 17 whose output terminal is connected to the set terminal S of the start-and-stop flip-flop circuit 16. To this AND circuit 17 are brought through the inverter circuit 18 outputs from the sprocket flip-flop circuit 8. The impression of these two outputs causes the AND circuit 17 to issue its output to the set terminal S of the start-and-stop flip-flop circuit. Signals to the AND circuit 17 are generated to set the start-and-stop flip-flop circuit 16 by the action of the inverter circuit 18 when the sprocket flip-flop circuit 8 is reset, namely, when a sprocket aperture of the paper tape passes to the photoelectric conversion element to cause the signal of said aperture to be no longer read by the photoelectric conversion element. When the stop flip-flop circuit 16 is set, a terminal 19 is supplied with a signal to stop the feeding of the paper tape. Then the tape is stopped by a stop device, for example, an assembly of a movable iron strip and magnet so arranged as to clamp the tape. In this case it is required that the tape be stopped before it approaches the next sprocket aperture following that which passed the photoelectric conversion element immediately prior to the setting of the stop flip-flop circuit 16. Following is the reason. If the tape is brought to reset at a point close by the next following sprocket aperture, any slight movement of the tape, said movement often appearing in the form of vertical shakings of the tape the moment it is started, causes the sprocket pulse to appear or not to appear in the sprocket flip-flop circuit 8, namely, causing the sprocket flip-flop circuit to be repeatedly set and reset with the resultant issue of data signals to the external apparatus 14 as when the paper tape is set in motion. The supply of data signals to the external apparatus 14 is only required at the time of starting the paper tape 3, namely, when said external apparatus 14 receives electric signals corresponding to the data apertures of the data apertures of the paper tape 3 from the data flip-flop circuits $11_1$, $11_2$ ..... $11_8$. Accordingly, it seems sufficient to inhibit outputs from the data flip-flop circuits $11_1$, $11_2$ ..... $11_8$ with outputs from the start-and-stop flip-flop circuit 16 which denote the stop condition. This stopping means may indeed be applicable if the paper tape can be brought to complete rest in an instant. However, during the period between the moment when the paper tape is shifted from the stop to the start and the moment when the tape begins to travel at a constant speed, said means undesirably causes sprocket pulses to be issued several times similarly to the aforementioned case.

In other words, the convention photoelectric reading apparatus of the aforesaid type should be stopped unfailingly between the peripheries of the two adjacent sprocket apertures. (This stopping means is known as the "Between Character System"System.") With this system, braking should be applied exactly when the photoelectric conversion means completely passes a sprocket aperture so as to stop it on this side of the following sprocket aperture. To describe more precisely, the photoelectric conversion means has to be stopped at that point on this side of the following sprocket aperture whose distance as measured from the center of the immediately preceding sprocket aperture is shorter than one pitch (the distance between the centers of two adjacent sprocket apertures) by a length equal to the radius of the sprocket aperture plus the amplitude of the minute shaking of the paper tape in the direction in which the tape travels. Accordingly, the distance covered by the paper tape during the period between the moment when a brake signal is issued and the moment when the tape is actually brought to rest is appreciably short. At the present time, however, there is an increasing demand for the more speedy reading of a paper tape. Accordingly, the prior reading device which allows the paper tape to travel only a short distance before it is actually stopped after a preliminary operation is taken for such such stop can not meet the desire of the present day, because the paper tape would be very likely to go too far beyond the specified stop point if its feeding speed should be accelerated. Further, Further, the prior reading device often causes the paper tape to be stopped too early when the photoelectric conversion element approaches the sprocket aperture and presents a lower stability due to the recurrence of the same signals as described above.

It is accordingly the object of the present invention to provide an apparatus of improved stability for photoelectrically reading a perforated tape, namely, to provide an apparatus for photoelectrically reading a perforated tape at a more accelerated speed than the prior device, given the same degree of stability.

According to this invention there is provided a photoelectric reading apparatus comprising an illuminating means, a movable medium perforated with sprocket apertures and data apertures of at least one channel, at least one photoelectric conversion element for detecting the sprocket apertures, a corresponding number of photoelectric conversion elements to said channel for reading signals representing the data aperture, a sprocket flip-flop circuit, a first means connected between the sprocket flip-flop circuit and the element for detecting the sprocket aperture thereby to set or reset said sprocket flip-flop circuit, a corresponding number of data flip-flop circuits to said channel, a second means connected between the data flip-flop circuits and data reading elements, a third means connected to the output terminal of the sprocket flip-flop circuit for supplying outputs from said sprocket flip-flop circuit to the second means, each of the second means being used in setting or resetting the corresponding ones of the data flip-flop circuits in accordance with the signals from the third means, a flip-flop circuit for controlling the start and stop of reading, and a fourth means connected between the reading control flip-flop circuit and third means for setting said reading control flip-flop circuit thereby to supply outputs from the data flip-flop circuits to an external means, characterized in that there is provided an additional photoelectric conversion element for detecting the sprocket apertures in such a manner that the distance between said additional photoelectric conversion element and first-mentioned sprocket aperture detecting element is not equal to an integral multiple of the fixed pitch between the sprocket apertures, the first means comprises a setting means for the first-mentioned sprocket aperture detecting element and a resetting means for the additional sprocket aperture detecting element, there are provided a corresponding number of AND circuits to the data flip-flop circuits, one input terminal of each of the AND circuits is connected to the corresponding output terminal of the data flip-flop circuits, and the other input terminal of each of the AND circuits is connected in common to one output terminal of the reading control flip-flop circuit, and the output terminals of the AND circuits are connected to the external means.

Figure 5:
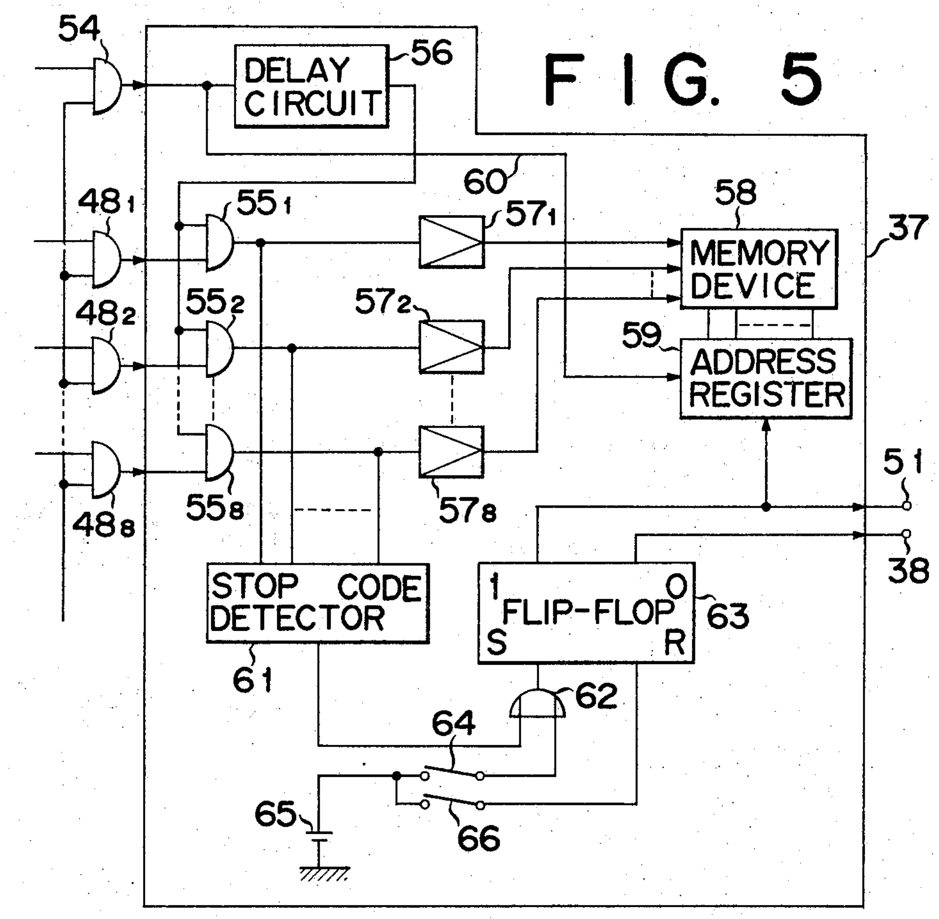
FIG. 5 shows in block an external apparatus in FIG. 4.
Figures 6A, 6B, 6C:
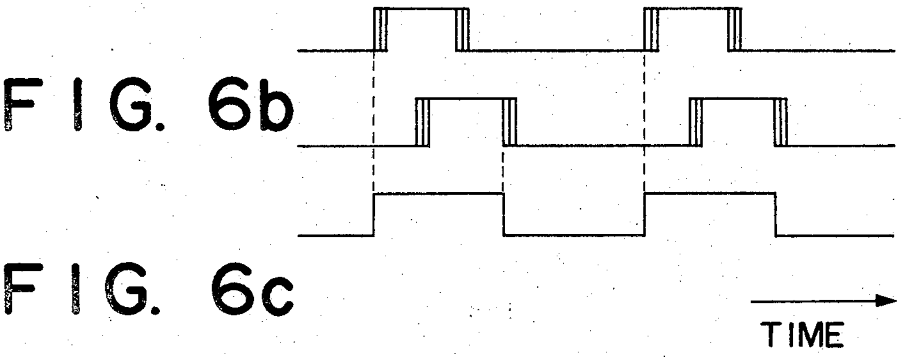

FIGS. 6*a* to 6*c* show the waveforms in certain parts of the circuit of FIG. 5.

Figures 3, 4:
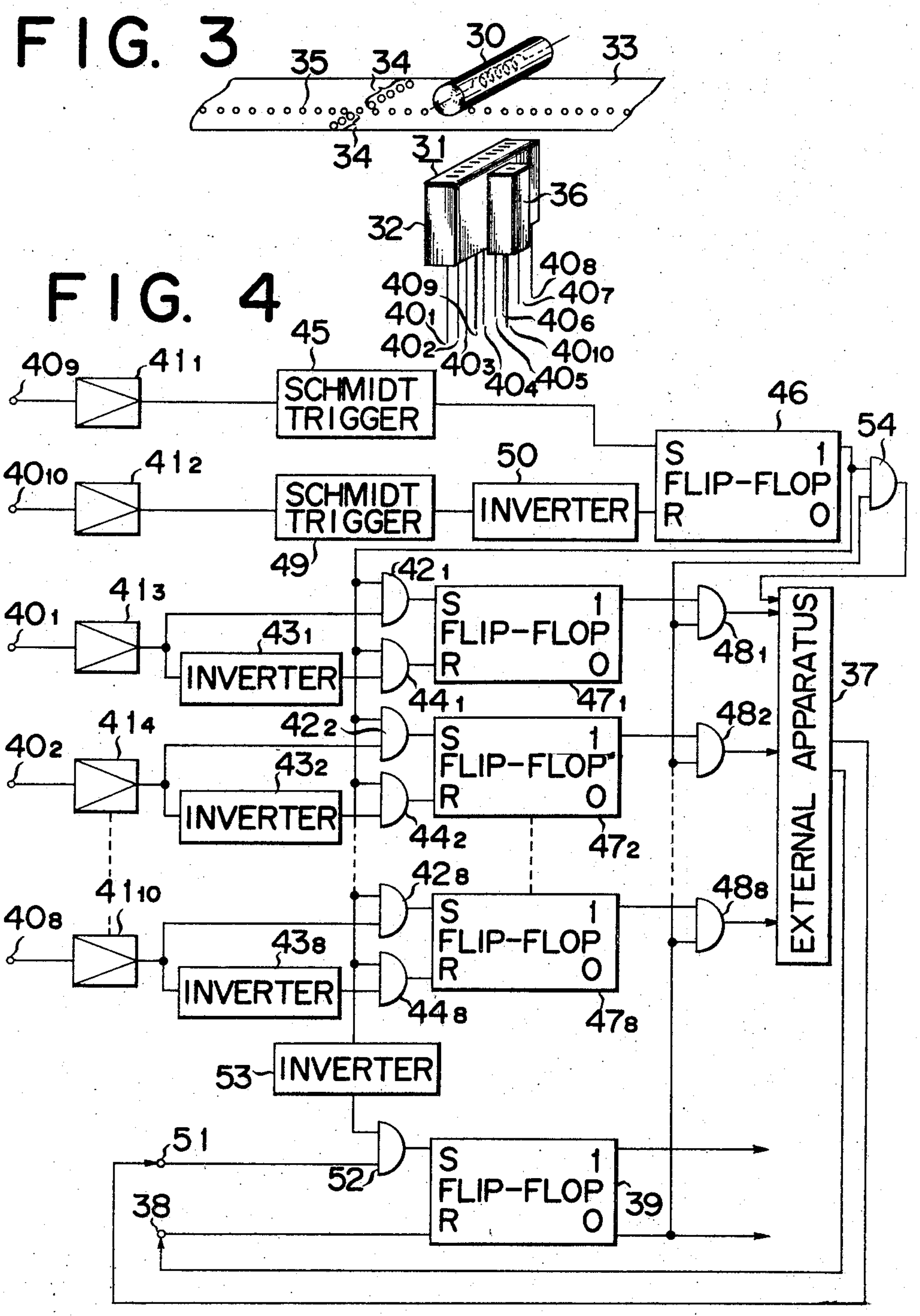
FIG. 3 is a schematic diagram of the photoelectric reading apparatus of the present invention.
FIG. 4 is a diagram of the reading control circuit connected to the photoelectric conversion means of the apparatus of the present invention as shown in FIG. 3.

There will now be described an embodiment of the present invention by reference to FIGS. 3 and 4.

The photoelectric reading apparatus of the present invention comprises an illuminating lamp 30 and a photoelectric conversion means <u>31</u> spatially disposed below the lamp 30. A paper tape perforated with data apertures 34 and sprocket apertures 35 for effecting the strobe of said data apertures is allowed to travel between the lamp and photoelectric conversion means. While the number of data apertures to be bored is not subject to any particular limitation, there will now be described a photoelectric reading apparatus using the 8-channel type paper tape 33 perforated with eight data apertures in a perpendicular direction to the feeding of the tape, namely, arranged in the lateral direction of the tape. In the illustrated embodiment, the pitch between the sprocket apertures 35 is 2.54 mm., and the radius of each data aperture is 0.9 mm. The photoelectric conversion means <u>31</u> consists of a main photoelectric conversion section 32 having a corresponding number of (nine in this case) photoelectric conversion elements to the sum of the data apertures 34 (eight) and the sprocket aperture 35 (one) and a supplementary photoelectric conversion section 36 positioned adjacent to said main photoelectric conversion section and provided with a corresponding number of (one) a photoelectric conversion element only to the sprocket aperture 35. To these photoelectric conversion elements are connected output terminals $40_1$, $40_2$ ..... $40_{10}$. Further to these terminals are connected amplifiers $41_1$, $41_2$ ..... $41_{10}$ as shown in FIG. 4. The output terminal of the amplifier $41_2$ contacting the terminal $40_{10}$ of the supplementary photoelectric conversion section 36 is connected through a Schmidt trigger circuit 49 and inverter circuit 50 to the reset terminal of the sprocket flip-flop circuit 46. The set terminal of the sprocket flip-flop circuit 46 is connected through another Schmidt trigger circuit 45 to the output terminal of the amplifier $41_1$, contacting the terminal $40_9$ of that photoelectric conversion element of the main photoelectric conversion section 32 which corresponds to the sprocket aperture. The output terminals of the amplifiers $41_3$ ..... $41_{10}$ respectively contacting the other terminals $40_1$ ..... $40_8$ drawn from the main photoelectric conversion section 32 are respectively connected through the AND circuits $42_1$, $42_2$ ..... $42_8$ to the set terminals of the data flip-flop circuits $47_1$, $47_2$ ..... $47_8$. The output terminals of the amplifiers $41_3$, $41_4$ ..... $41_1$ are connected through the inverter circuits $43_1$, $43_2$ ..... $43_8$ to another group of AND circuits $44_1$, $44_2$ ..... $44_8$. The output terminals of these circuits $44_1$, $44_2$ ..... $44_8$ are connected to the reset terminals of the data flip-flop circuits $47_1$, $47_2$ ..... $47_8$. The output terminals 1 of these circuits $47_1$, $47_2$ ..... $47_8$ are connected through a separate group of AND circuits $48_1$, $48_2$ ..... $48_8$ to an external apparatus 37, for example, an operation control circuit. This external apparatus 37 is connected through a terminal 38 to the reset terminal of a start-and-stop flip-flop circuit 39. The set terminal of the start-and-stop flip-flop circuit 39 is connected to the output terminal 1 of the sprocket flip-flop circuit 46 through an inverter circuit 53 and AND circuit 52. The output terminal of the sprocket flip-flop circuit 46 is connected to one input terminal of each of the AND circuits $42_1$, $42_2$ ..... $42_8$ and $44_1$, $44_2$ ..... $44_8$. One input terminal of the AND circuit 52 contacting the set terminal of the start-and-stop flip-flop circuit 39 is connected through a terminal 51 to the external apparatus 37. One output terminal 1 of the start-and-stop flip-flop circuit 39 is connected to a brake means (not shown) for stopping the travel of the paper tape 33. The other output terminal 0 of the start-and-stop flip-flop circuit 39 is connected to a start means for initiating the feeding of the paper tape 33.

The aforementioned flip-flop circuits 39, 46 and $47_1$, $47_2$ ..... $47_8$ are all of an AC (alternating current) type and are only used in the rise of the input signal. However, it will be apparent that said circuits may consist of a DC (direct current) type.

Numeral 54 denotes an AND circuit. One of its input terminals is connected to the 1 output terminal of the flip-flop circuit 46, and the other input terminal to the input terminals of the AND circuits $48_1$, $48_2$ ..... $48_8$. (Said input terminals are commonly connected to the 0 output terminal of the flip-flop circuit 39.) Like the external apparatus 37, the AND circuit 54 does not constitute the feature of the present invention.

Referring now to FIG. 5, the output terminals of the AND circuits $48_1$, $48_2$ ..... $48_8$ are respectively connected to one of the input terminals of each of AND circuits $55_1$, $55_2$ ..... $55_8$. The other input terminals of the AND circuits $55_1$, $55_2$ ..... $55_8$ are commonly connected through a delay circuit 56 to the output terminal of the AND circuit 54. The output terminals of the AND circuit $55_1$, $55_2$ ..... $55_8$ are connected to a memory device 58 through respective amplifiers 571, $57_2$ ..... $57_8$. An address register 59 built in the memory device 58 is connected through an address advance pulse line 60 to the output terminal of the AND circuit 54.

The output terminals of the AND circuits $55_1$, $55_2$ ..... $55_8$ are also connected to a stop code detector 61. The output terminal of the detector 61 is connected through an OR circuit 62 to the set terminal of a flip-flop circuit 63. The other input terminal of the OR circuit 62 is connected through a stop key 64 to a source of signals or a battery 65. The reset terminal of the flip-flop circuit 63 is connected through a start key 66 to the source 65 of signals. The 1 output terminal of the flip-flop circuit 63 is connected to the address register 59 and terminal 51, and the 0 output terminal of said flip-flop circuit 63 to the terminal 38.

As described above, the external apparatus 37 does not constitute the feature of the present invention, nor is limited to the type shown in FIG. 5.

There will now be described the operation of the photoelectric reading apparatus of the present invention.

When the start key 66 of the external apparatus 37 is closed, the flip-flop circuit 63 is reset to cause an output to appear at the 0 output terminal and consequently at the terminal 38. Accordingly, the flip-flop circuit 39 of FIG. 4 is reset to cause a signal to be issued on the 0 output side of said circuit 39. This signal actuates a start magnet (not shown) to commence the feeding of the paper tape 33. When the paper tape 33 begins to travel there is generated an electric signal corresponding to the apertures perforated in the tape at the terminals $40_1$, $40_2$ ..... $40_{10}$ of the photoelectric conversion means 31. In this case, the sprocket aperture 35 is generally smaller than the data aperture 34, so that outputs from the amplifiers $41_3$, $41_4$ ..... $41_{10}$ appear earlier than those from the amplifiers $41_1$ and $41_2$ and are supplied either to the AND circuits $42_1$, $42_2$ ..... $42_8$ or to the AND circuits $44_1$, $44_2$ ..... $44_8$ with their polarity reversed by the inverter circuits $43_1$, $43_2$ ..... $43_8$. When, under this condition, the sprocket aperture 35 causes an output to appear in the amplifier $41_1$, then there is shaped the waveform of said output signal by the Schmidt trigger circuit 45. The signal of this waveform enters the set terminal of the sprocket flip-flop circuit 46 to set it. This set signal is supplied to the AND circuits $42_1$, $42_2$ ..... $42_8$ and $44_1$, $44_2$ ..... $44_8$. The signals only corresponding to the data apertures 34 are supplied to set the data flip-flop circuits $47_1$, $47_2$ ..... $47_8$. The set signals from the data flip-flop circuits $47_1$, $47_2$ ..... $47_8$ are respectively impressed on one input terminal of each corresponding one of the AND circuits $48_1$, $48_2$ ..... $48_8$. All the other input terminals of the AND circuits $48_1$, $48_2$ ..... $48_8$ receive signals from the 0 output terminal of the start-and-stop flip-flop circuit 39. At the output terminals of the AND circuits $48_1$, $48_2$ ..... $48_8$ are generated the signals corresponding to the data apertures 34 of the paper tape 33, said signals being thereafter forwarded to the external apparatus 37.

At this time the external apparatus 37 is supplied through the AND circuit 54 with strobe sprocket signals, together with the output from the flip-flop circuit 39. Data signals from the AND circuits $48_1$, $48_2$ ..... $48_8$, as well as the strobe or sprocket pulse delayed by the delay circuit 56, are introduced through the AND circuits $55_1$, $55_2$ ..... $55_8$ into the amplifiers $57_1$, $57_2$ ..... $57_8$ respectively. On the other hand, the strobe or sprocket pulse advances the address register 59 to cause the data signals to be stored by turns into the memory device 58.

Outputs from the supplementary photoelectric conversion section 36 for the sprocket signal is supplied to the inverter circuit 50 from the terminal $40_{10}$ through the amplifier $41_2$ and Schmidt trigger circuit 49. Accordingly, the sprocket flip-flop circuit 46 is reset by the latter edge, namely, the falling portion of the sprocket signal.

When the data and sprocket apertures pass over the photoelectric conversion means 31, signals are transmitted to the external apparatus 37 in the same manner as described above.

Figure 1:
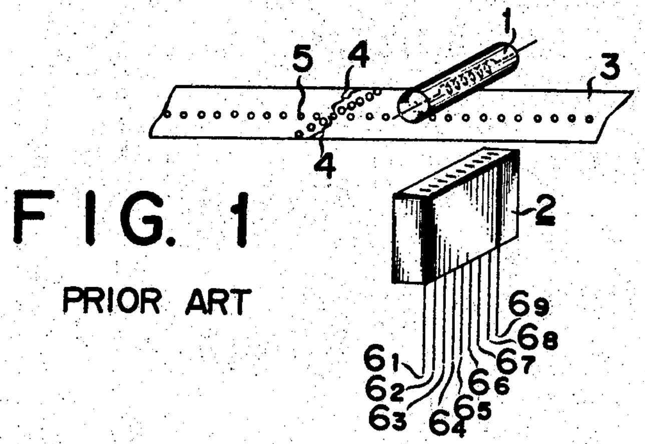
FIG. 1 PRIOR ART
FIG. 1 is a schematic diagram of the prior art photoelectric reading device.
Figure 2:
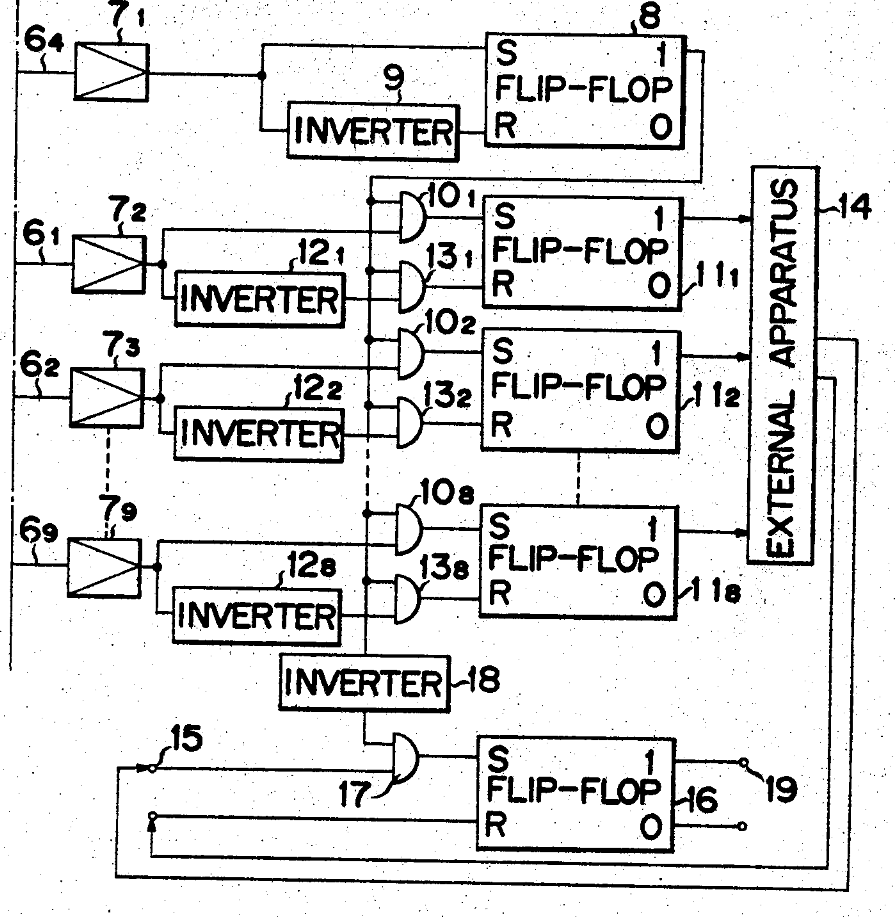
FIG. 2 PRIOR ART
FIG. 2 is a diagram of the reading control circuit connected to the photoelectric conversion means of the prior art device of FIG. 1.

There will now be described the case where the feeding of the paper tape is stopped. As in the prior art system described by reference to FIGS. 1 and 2, a stop signal is obtained by perforating a data aperture only in the channel corresponding to the terminal $40_1$. An output signal from the terminal $40_1$ is supplied to the external apparatus 37 through the amplifier $41_3$, AND circuit $42_1$, data flip-flop circuit $47_1$ and AND circuit $48_1$. The output signal from the AND circuit $48_1$ is transmitted through the AND circuit $55_1$ to the stop code detector 61. The output from the stop code detector 61 passes through the OR circuit 62 to set the flip-flop circuit 63. The 1 output from said circuit 63 is supplied to the terminal 51 and then to one input terminal of the AND circuit 52. At this time the 1 output clears the address register 59. When the sprocket flip-flop circuit 46 is later reset, there is supplied an input from the inverter circuit 53 to the other input terminal of the AND circuit 52, causing the flip-flop circuit 39 to be set by the AND circuit 52. The setting of the flip-flop circuit 39 actuates the brake for stopping the travel of the paper tape. Since, at this time, one input terminal of each of the AND circuits $48_1$, $48_2$ ..... $48_8$ is opened, the external apparatus 37 does not give forth any data.

As clearly seen from FIG. 5, the tape feed can also be stopped by closing the stop key 64.

There will now be described the function of the supplementary photoelectric conversion section 36, whose function has not up to this point been clearly defined. As mentioned above, that one of the elements involved in the main photoelectric conversion section 32 which corresponds to the terminal $40_9$ matches the sprocket apertures of the paper tape 33, and the element of the supplementary photoelectric conversion section 36 also matches the sprocket apertures. According to the present invention, the timing of detecting a sprocket aperture by the sprocket element of the main photoelectric conversion section 32 is displaced from that which is used in detecting a sprocket aperture by the element of the supplementary photoelectric conversion section 36, so that the distance between the element of the main photoelectric conversion section 32 and that of the supplementary photoelectric conversion section 36, namely, the length of a straight line connecting the centers of both elements is rendered unequal to an integral multiple of the pitch between the sprocket apertures. An alternative method consists in arranging two independent photoelectric conversion elements in mutually displaced positions relative to the same sprocket aperture in the direction of feeding the paper tape. Namely, the element of the main photoelectric conversion section 32 and that of the supplementary photoelectric conversion section 36 take their respective positions in such a manner that the distance between these two elements differs from an integral multiple of the pitch between the sprocket apertures by that extent which is equal to a sum of the apparent shifting distance of the paper tape due to its vibration occurring at the moment it is started or stopped and the amplitude of the apparent minute shaking of the paper tape when it is stopped. With such arrangement, the paper tape need not be stopped between characters, but is only required to be brought to rest within one pitch between the sprocket apertures, as clearly seen from FIGS. *6a* to *6c*. The distance of the sprocket photoelectric conversion element of the main photoelectric conversion section 32 and the photoelectric conversion element of the supplementary photoelectric conversion section 36, namely, the length of a straight line connecting the centers of both photoelectric conversion elements is not equal to an integral multiple of the pitch between the sprocket apertures perforated in the tape. Accordingly, the waves of output signals from the Schmidt trigger circuits 45 and 49 assume such forms as shown in FIGS. *6a* and *6 b* respectively. Thus outputs from the sprocket flip-flop circuit 46 will have the waveform as presented in FIG. *6 c*. This indicates that the sprocket flip-flop circuit is prevented from being repeatedly set and reset due to the undesirable vibrations of the tape.

Now let it be assumed that there is issued a stop order from the external apparatus 37 of the terminal 51 and consequently to one input terminal of the AND circuit 52 in response to the stored data as described above. Later when the element of the supplementary photoelectric conversion section 36 detects the latter edge or falling portion of the sprocket aperture signal, the sprocket flip-flop circuit 46 is reset and there is supplied a signal to the other input terminal of the AND circuit 52 by the action of the inverter circuit 53. Accordingly the AND circuit 52 is rendered conductive to set the start-and-stop flip-flop circuit 39. This setting causes a signal to be issued from the output terminal 1 of said circuit so as to actuate a brake means (not shown). Even when the brake means is actuated, the paper tape still continues its travel for a certain length before it actually stops. Now let it be assumed that the element of the supplementary photoelectric conversion section 36 is stopped under the next following sprocket aperture. In this case the sprocket element (corresponding to the terminal $40_0$) of the main photoelectric conversion section 32 is exposed to light to set the sprocket flip-flop circuit 46 and the set signal is supplied to one input terminal of each of the AND circuits $42_1$, $42_2$ ..... $42_8$. If, at this time, the data elements of the main photoelectric conversion section 32 are already supplied with inputs, they are brought to the other input terminal of each of the AND circuits $42_1$, $42_2$ ..... $42_8$, which in turn set the data flip-flop circuits $47_1$, $47_2$ ..... $47_8$. Outputs from these circuits $47_1$, $47_2$ ..... $47_8$ are supplied to one input terminal of each of the AND circuits $48_1$, $48_2$ ..... $48_8$. In this case, however, the start-and-stop flip-flop circuit 39 is set, and the AND circuits $48_1$, $48_2$ ..... $48_8$ are closed, so that there is no possibility of any data being supplied to the external apparatus 37.

Further, the sprocket flip-flop circuit 46 is reset by the latter edge or falling portion of the sprocket signal read out by the element of the supplementary photoelectric conversion section 36, so that the sprocket flip-flop circuit 46 is not repeatedly set and reset, but performs a stable operation, even though the paper tape may vibrate.

As mentioned above, the photoelectric reading apparatus of the present invention allows the paper tape to travel a greater distance during the period from the moment a brake signal is issued to the moment when the paper tape is actually stopped, provided the reading velocity is the same as is possible with the conventional device, thus performing a very stable reading operation. Also given the same degree of stability as in the prior device, the present invention can elevate the reading velocity.

I claim:

1. A photoelectric apparatus for reading information stored in a movable tape perforated with sprocket apertures and data apertures of a channel, comprising an illuminating means, a photoelectric conversion element for detecting the sprocket apertures, a corresponding number of photoelectric conversion elements to said channel for reading signals representing the data apertures, a sprocket flip-flop circuit, a first means connected between the sprocket flip-flop circuit and the element for detecting the sprocket aperture thereby to set or reset said sprocket flip-flop circuit, a corresponding number of data flip-flop circuits to said channel, a second means connected between the data flip-flop circuits and data reading elements, a third means connected to the output terminal of the sprocket flip-flop circuit for supplying outputs from said sprocket flip-flop circuit to the second means, each of the second means being used in setting or resetting the corresponding ones of the data flip-flop circuits in accordance with the signals from the third means, a flip-flop circuit for controlling the start and stop of reading, and a fourth means connected between the reading control flip-flop circuit and third means for setting said reading control flip-flop circuit, whereby outputs from the data flip-flop circuits are supplied to an external means, characterized in that there is provided an additional photoelectric conversion element for detecting the sprocket aperture in such a manner that the distance between said additional photoelectric conversion element and first-mentioned sprocket aperture detecting element is not equal to an integral multiple of the fixed pitch between the sprocket apertures, the first means comprising a setting branch for the first-mentioned sprocket aperture detecting element and a resetting branch for the additional sprocket aperture detecting element; and that there are provided a corresponding number of AND circuits to the data flip-flop circuits, one input terminal of each of the AND circuits being connected to the corresponding output terminal of the data flip-flop circuits, and the other input terminal of each of the AND circuits being connected in common to one output terminal of the reading control flip-flop circuit, the output terminals of the AND circuits being connected to the external means.

2. A photoelectric reading apparatus according to claim 1 wherein the setting branch of the first means includes a Schmidt trigger circuit.

3. A photoelectric reading apparatus according to claim 2 wherein the resetting branch of the first means includes a Schmidt trigger circuit.

4. A photoelectric reading apparatus according to claim 1 wherein said setting branch is responsive to a rising portion of a signal from said first-mentioned sprocket aperture detecting element, and said resetting branch is responsive to a falling portion of a signal from said additional sprocket aperture detecting element.